(12) United States Patent
Mete

(10) Patent No.: US 6,279,703 B1
(45) Date of Patent: Aug. 28, 2001

(54) SHOCK ABSORBING ADJUSTING STRUCTURE

(75) Inventor: Mike Mete, Santa Barbara, CA (US)

(73) Assignee: A-Pro Cycles, Inc., Taichung Hsien (TW)

(*) Notice: Subject to any disclaimer, the term of this patent is extended or adjusted under 35 U.S.C. 154(b) by 0 days.

(21) Appl. No.: 09/571,731

(22) Filed: May 15, 2000

(51) Int. Cl.[7] .................................................. F16F 9/44
(52) U.S. Cl. ............................ 188/319.1; 188/322.15; 267/64.18; 280/284
(58) Field of Search ...................... 188/266.1, 266.2, 188/319.1, 319.2, 322.15, 322.22, 317, 316, 299.1; 267/64.18, 64.12, 64.22, 64.26; 280/274, 275, 281.1, 284, 285

(56) References Cited

U.S. PATENT DOCUMENTS

| | | | |
|---|---|---|---|
| 1,205,433 | * 11/1916 | Christman | 188/319.1 |
| 4,337,850 | * 7/1982 | Shimokura | 188/319.1 |
| 4,685,545 | * 8/1987 | Fannin et al. | 188/299.1 |
| 5,320,375 | * 6/1994 | Reeves et al. | 188/319.1 X |
| 5,988,330 | * 11/1999 | Morris | 188/322.15 |

* cited by examiner

Primary Examiner—Robert J. Oberleitner
Assistant Examiner—Pamela J. Rodriguez
(74) Attorney, Agent, or Firm—Rosenberg, Klein & Lee

(57) ABSTRACT

A shock absorbing adjusting structure includes a cylinder with a tube movably received in the cylinder. One end of the cylinder is connected to a part of a bicycle frame and one end of the tube is connected to another part of the bicycle frame. A sleeve is fixedly connected to the cylinder and connected to a piston assembly movably inserted in the sleeve. A tapered hole and a plurality of through holes are defined through the piston assembly. A seal member is urged by a spring in the piston assembly and seals the through holes. A pusher in the piston assembly is urged by a rod which extends from an inside of the cylinder and is movably received in the sleeve. The rod is moved by an actuating bar which is operated by a rider from outside of the cylinder so as to movably adjust a tapered tip of the rod relative to the tapered hole in the piston assembly.

6 Claims, 6 Drawing Sheets

SHOCK ABSORBING ADJUSTING STRUCTURE

FIELD OF THE INVENTION

The present invention relates to a bicycle shock absorbing adjusting structure wherein the damping force of the absorbing device can be conveniently adjusted by operating the only one adjusting lever.

BACKGROUND OF THE INVENTION

According to FIG. 6 a conventional bicycle shock absorbing device generally includes a cylinder 71 that is fixedly connected to a bicycle frame such as the seat tube and a plug 72 having a first end thereof movably received in the cylinder 71. An end member 70 is connected to a second end of the plug 72 and is fixedly connected to another part of the bicycle frame such as a down tube. A first collar 73 is mounted to the cylinder 71 and a second collar 74 is connected to the end member 70. A spring 75 is mounted to the plug 72 and the cylinder 71, and is biased between the first collar 73 and the second collar 74. A container 77 is connected to the cylinder 71 so as to store hydraulic oil therein which results in damping force when the plug 72 moves relative to the cylinder 71. Two adjusting buttons 76 and 78 are located at the cylinder 76 and the end member 70 so as to adjust the "stiffness" of the shock absorbing device according to practical needs when the bicycle is ridden on rugged roads. It is inconvenient for the rider to adjust the shock absorbing device on the two adjusting buttons 76 and 78.

The present invention intends to provide a shock absorbing adjusting structure that allows the rider to adjust the shock absorbing device by operating the only one adjusting lever.

SUMMARY OF THE INVENTION

In accordance with one aspect of the present invention, there is provided a shock absorbing adjusting structure and comprising a cylinder and a tube movably inserted into a first end of the cylinder. An end member is connected to a second end of the cylinder and connected to a bicycle frame. A passage is defined radially in the end member and a central hole is defined in a first side of the end member. An actuating bar is rotatably inserted in the passage and a cam means is located on a first end of the actuating bar. A first end of the tube is connected to the bicycle frame and a second end of the tube is sealed by a ring assembly which is movably engaged with an inside of the cylinder.

A sleeve has a first end securely engaged with the central hole and a rod is movably received in the sleeve. A second end of the sleeve movably extends through the ring assembly and is connected to a piston assembly located in the tube. The rod has a first end engaged with the cam means of the actuating bar and a second end of the rod is a tapered tip. A tapered hole is defined centrally through the piston assembly and a plurality of through holes are defined through the piston assembly. A pusher is movably received in the piston assembly and a seal member is located between the pusher and an inside of the piston assembly to seal the through holes by a spring biased between the seal member and the pusher which is urged by the rod. The tapered tip of the rod is movably engaged with the tapered hole.

The object of the present invention is to provide a bicycle shock absorbing adjusting structure that has only one adjusting lever to adjust the damping force between the cylinder and the sleeve.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
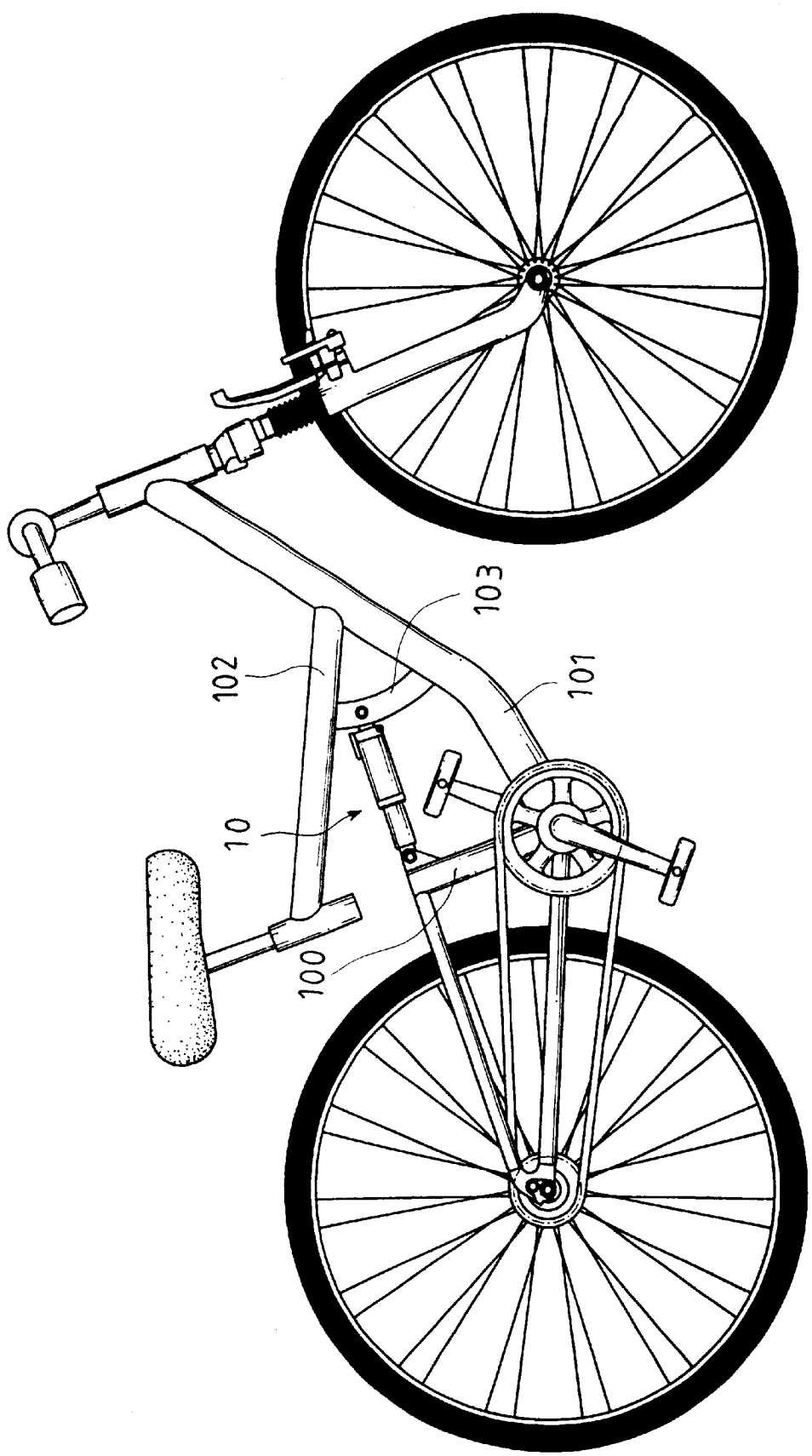
FIG. 1 is a side view to show a bicycle equipped with a shock absorbing device that has an adjusting structure of the present invention.
Figure 2:
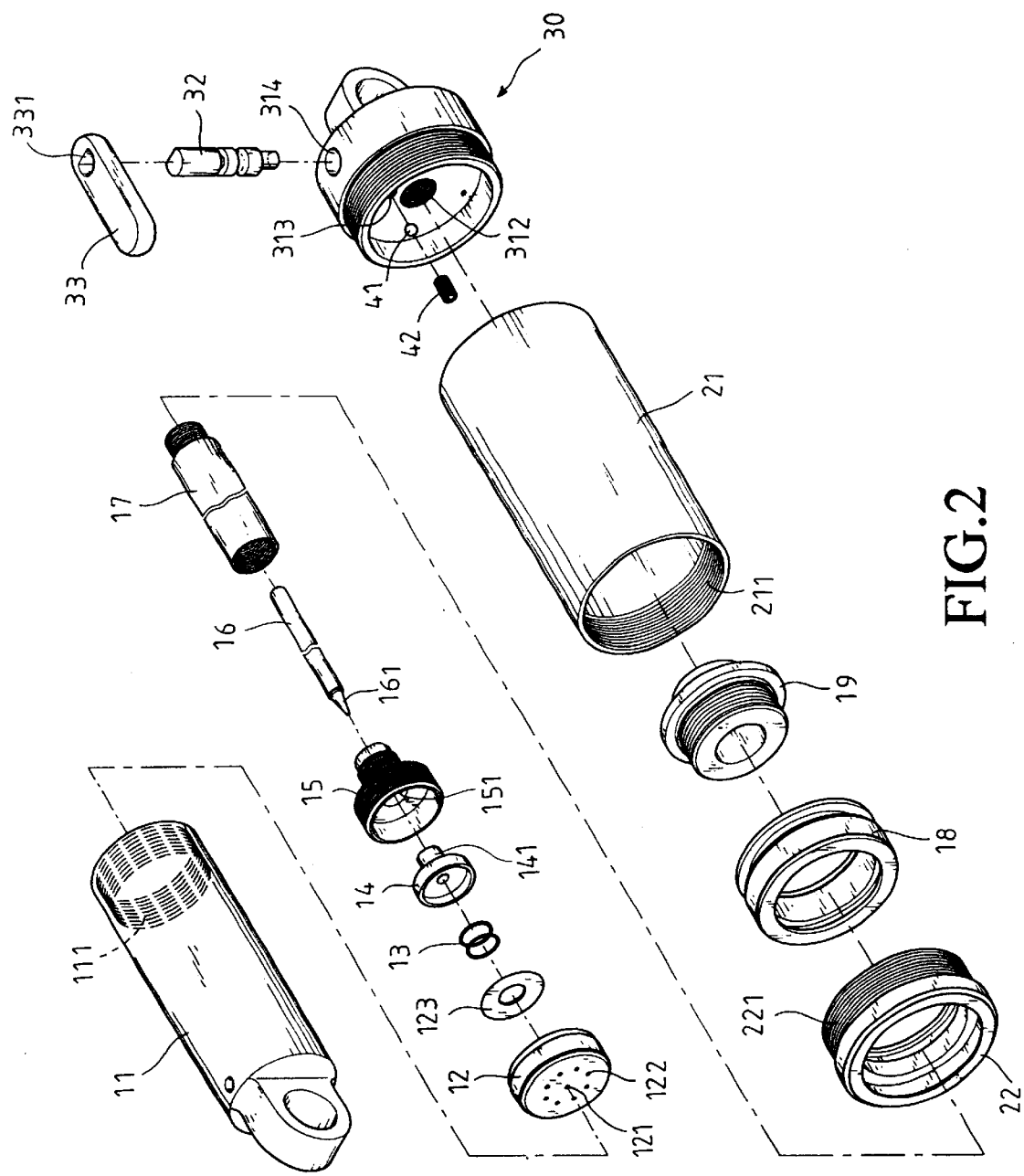
FIG. 2 is an exploded view to show the shock absorbing device and the adjusting structure of the present invention.
Figure 3:
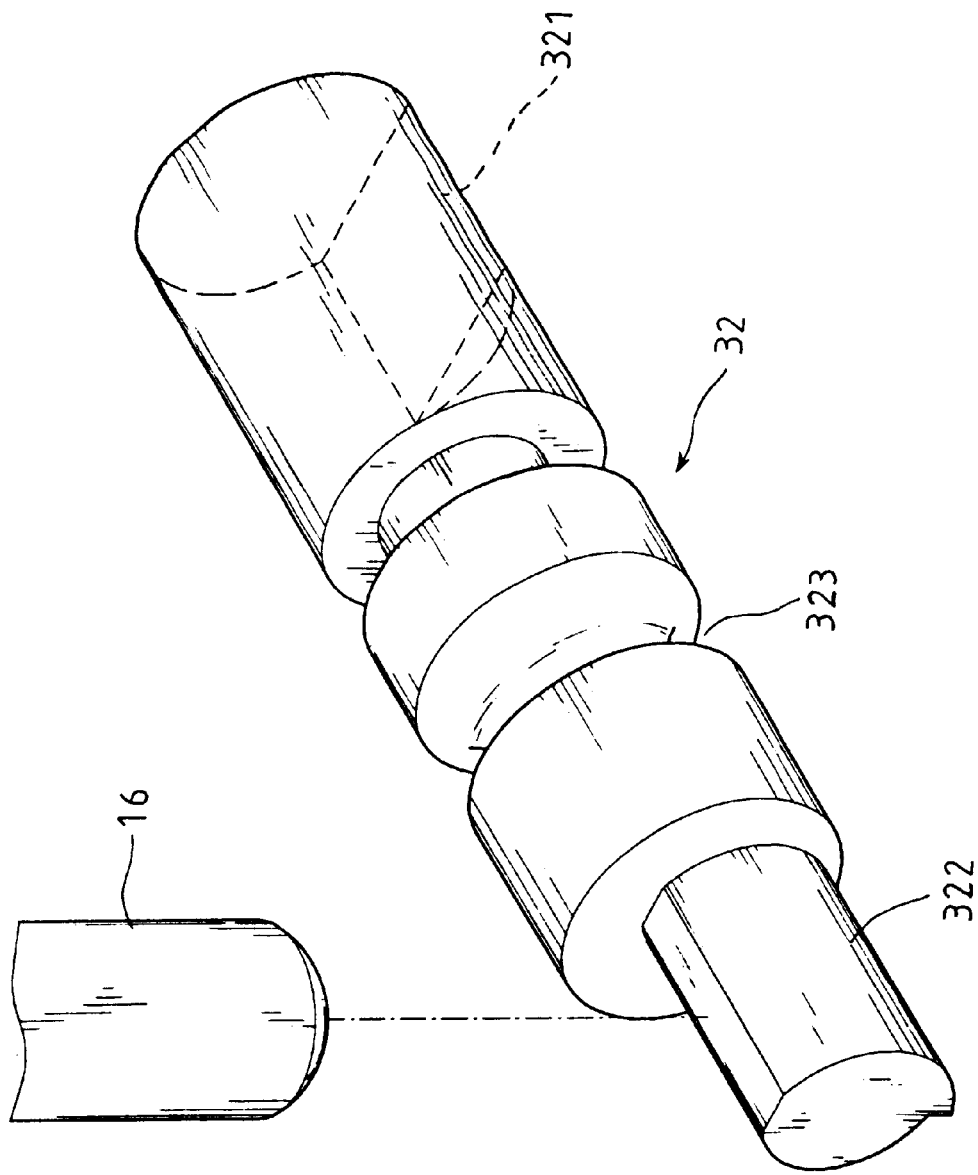
FIG. 3 is an exploded view to illustrate the cam means of the actuating bar and the rod in the sleeve.
Figures 4, 4A:
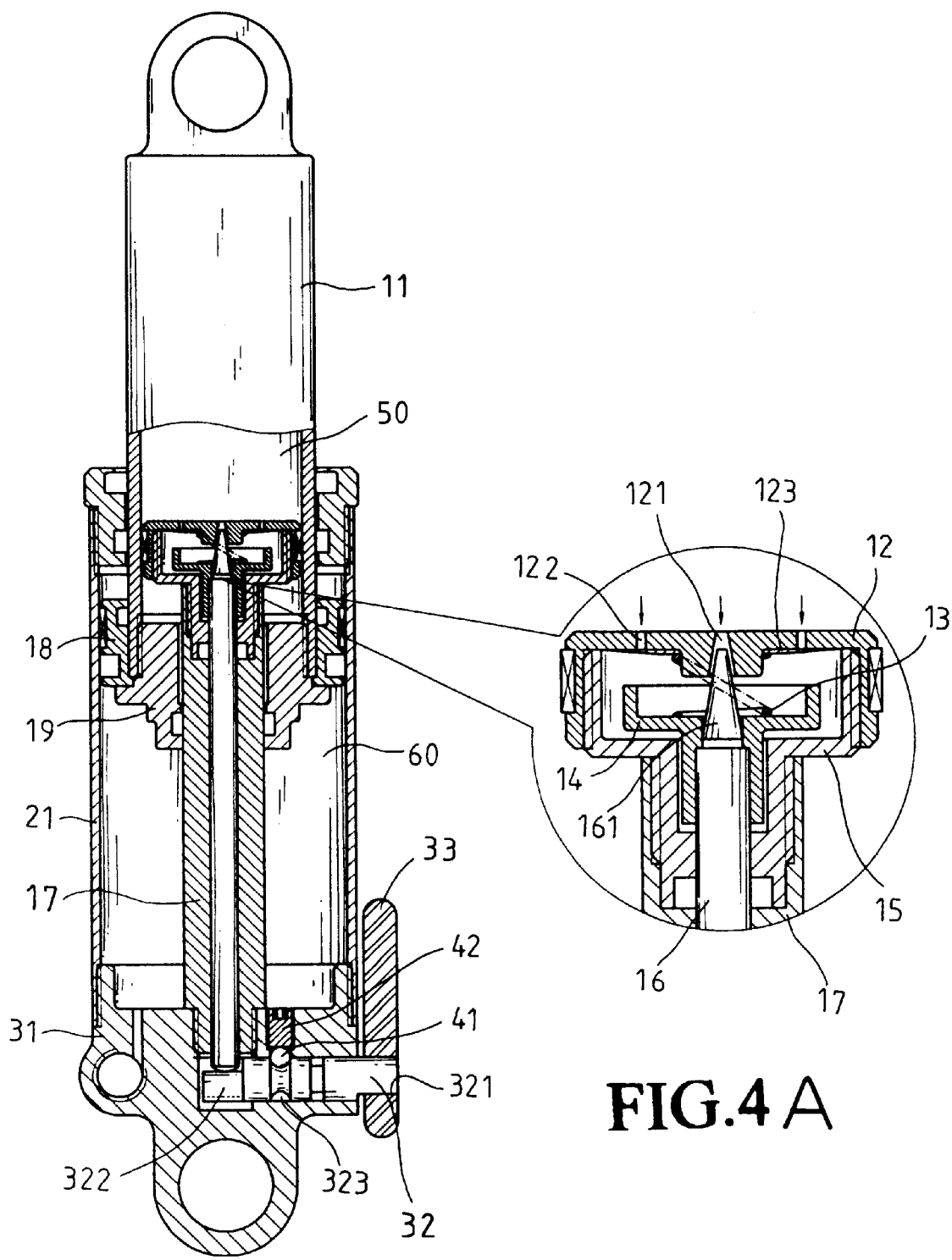
FIG. 4 is a side elevational view, partly in section, of the shock absorbing device of the present invention, wherein the shock absorbing device is not yet actuated.
FIG. 4A is an enlarged view to show the seal member is urged by the spring to seal the tapered hole and through holes in the piston assembly.

Referring to FIGS. 1, 2, 4 and 4A, a shock absorbing device 10 is connected between a seat tube 100 of a bicycle and a plate 103 connected between a down tube 101 and a top tube 102 of the bicycle. The shock absorbing device 10 comprises a cylinder 21 and a tube 11 is movably inserted into a first end of the cylinder 21. A collar 22 having a threaded outside 221 is threadedly connected to a threaded inside in the first end of the cylinder 21 so that the tube 11 extends through the collar 22 and is inserted into the cylinder 21. An end member 30 is threadedly connected to a second end of the cylinder 21 and has a ring on a first end of the end member 30 so as to be connected to the plate 103. The tube 11 has a ring on a first end thereof so as to be connected to the seat tube 100 and a second end of the tube 11 is sealed by a ring assembly which is movably engaged with an inside of the cylinder 21. The ring assembly includes a ring member 18 and an end collar 19 which has a threaded outside so as to be threadedly connected with a threaded inside of the tube 11. The ring member 18 is mounted to the outside of the tube 11 and movably engaged with the inside of the cylinder 21. A passage 314 is defined radially in the end member 30, and a central hole 312 and an aperture 313 are defined in a second side of the end member 30. The passage 314 communicates with the central hole 312 and the aperture 313. An actuating bar 32 is rotatably inserted in the passage 314 and a cam means 322 is located on a first end of the actuating bar 32. As shown in FIG. 3, the cam means is an stud 322 extending eccentrically and longitudinally from the first end of the of the actuating bar 32. A groove 323 is defined radially in the actuating bar 32, and a ball 41 and a spring 42 are respectively received in the aperture 313. The ball 41 is biased by the spring 42 and engaged with the groove 323 so that the actuating bar 32 is positioned. A second end of the actuating bar 32 extends out from the passage 314 and has a surface 321 defined in an outside thereof. An adjusting lever 33 has a hole 331 in one end thereof and the second end of the actuating bar 32 is securely engaged with the hole 331.

A sleeve 17 has a threaded section extending from a first end thereof so as to be securely engaged with the central hole 312 and a rod 16 is movably received in the sleeve 17. A second end of the sleeve 17 movably extends through the ring assembly and is located in the tube 11. A first end of the rod 16 is engaged with the cam means of the actuating bar 32 and a second end of the rod 16 is a tapered tip 161. A piston assembly is connected to a second end of the sleeve 17 and includes a bowl member 15 threadedly engaged with the second end of the sleeve 17 and a cover member 12. The cover member 12 is threadedly mounted to the bowl member 15. A tapered hole 121 and through holes 122 are defined through the cover member 12. A recess 151 is defined in a center of the bowl member 15 and a pusher 14 is movably received in the bowl member 15. The pusher 14 has a guide tube 141 extending from one end thereof so as to be movably received in the recess 151 of the bowl member 15. A flexible seal member 123 is located between the pusher 14 and an inside of the cover member 12. A spring 13 is biased between the seal member 123 and the pusher 14 so as to urge the seal member 123 to seal the through holes 122. The tapered tip 161 of the rod 16 extends through the pusher 14 and urges the pusher 14 towards the tapered hole 121. The tapered tip 161 of the rod 16 is movably engaged with the tapered hole 121. Therefore, when the hydraulic liquid in a chamber 50 in the tube 11 is compressed, the liquid pushes the seal member 123 away from the cover member 12 and enters in the space between the cover member 12 and the bowl member 15 via the through holes 122 and a gap between the tapered hole 121 and the tapered tip 161 of the rod. Therefore, the shock absorbing device is soft.

Figures 5, 5A:
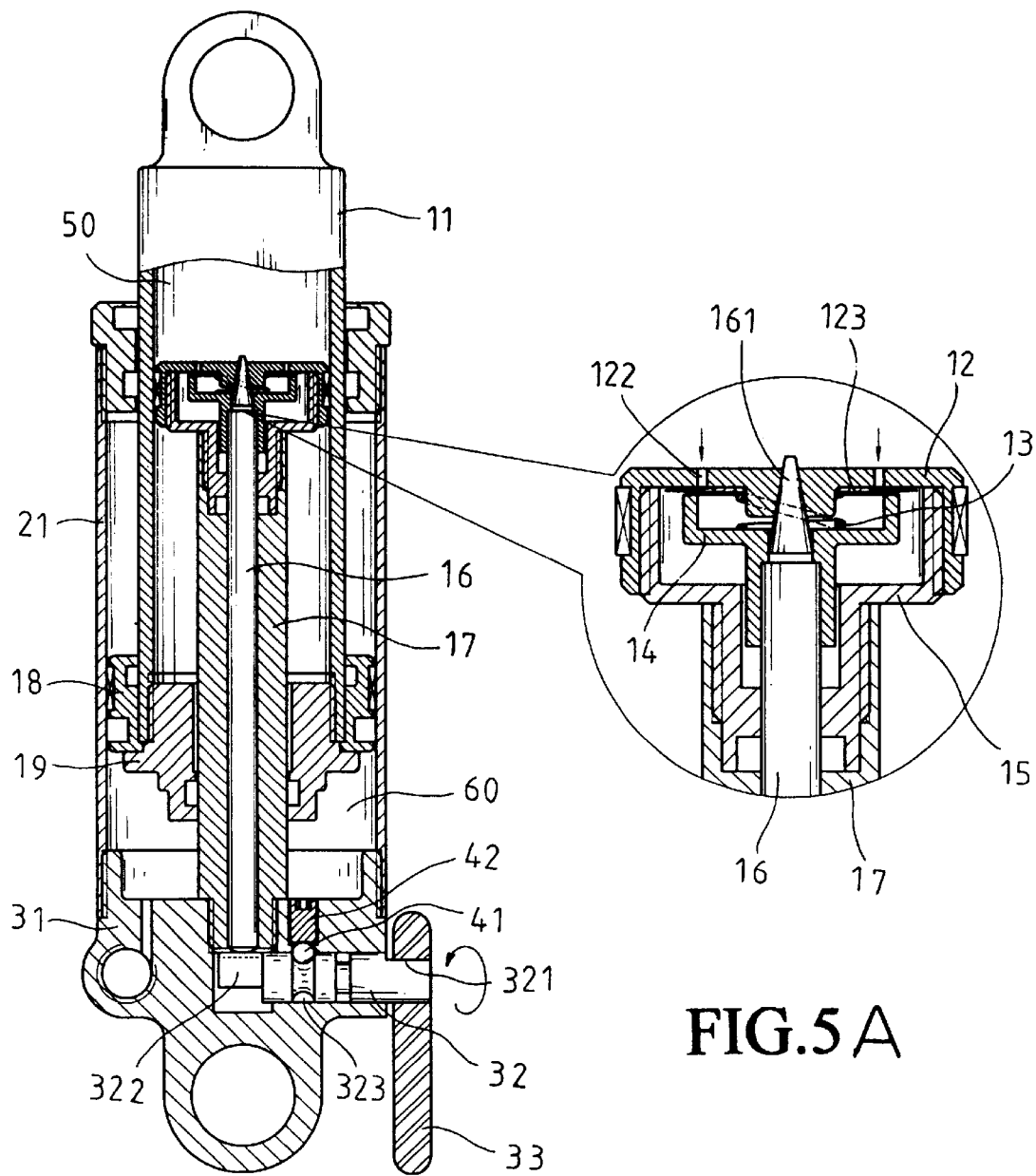
FIG. 5 is a side elevational view, partly in section, of the shock absorbing device of the present invention, wherein the shock absorbing device is actuated.
FIG. 5A is an enlarged view to show the tapered tip of the rod is moved toward the tapered hole by rotating the actuating bar.
Figure 6:
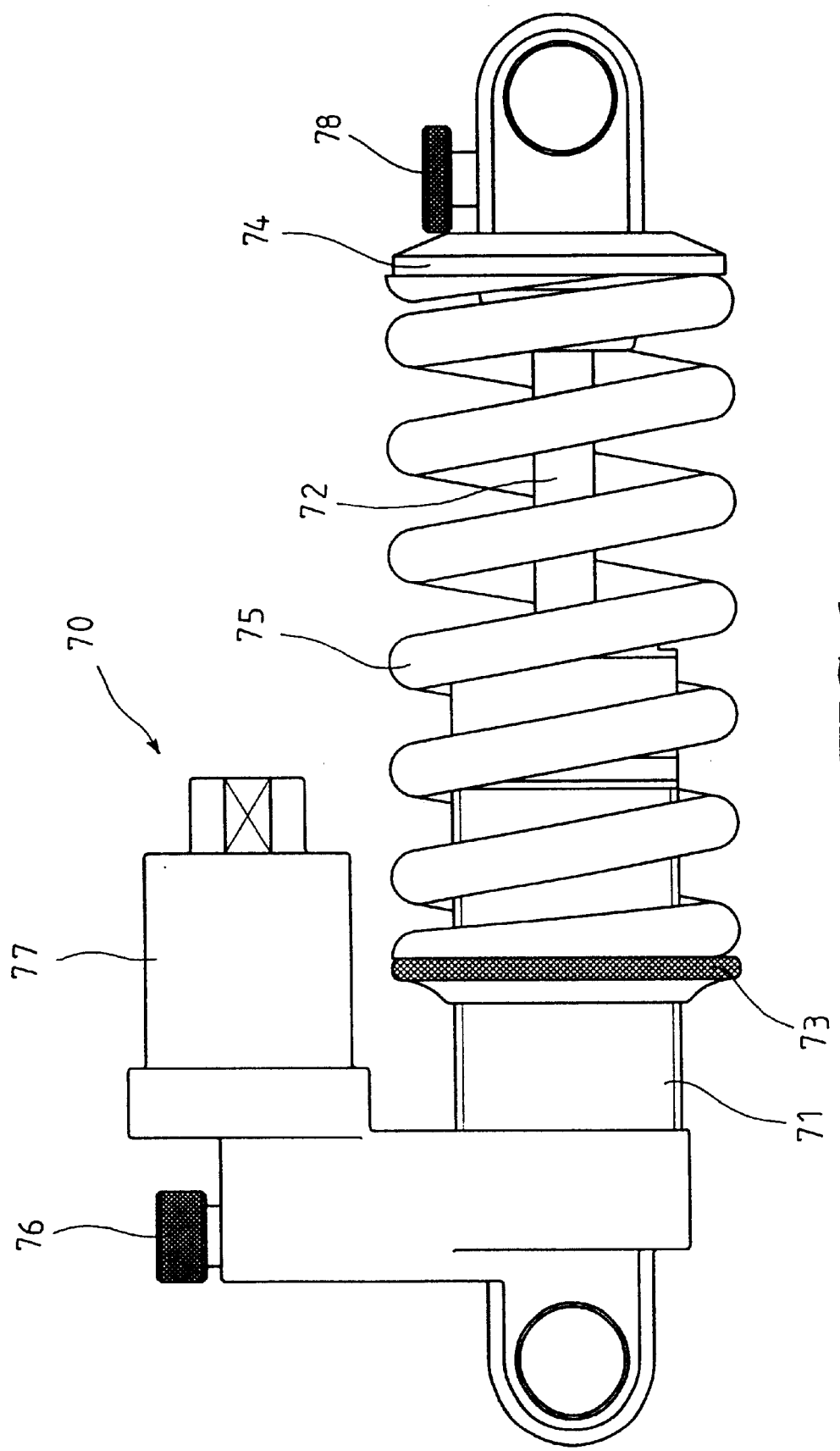
FIG. 6 is a side view to show a conventional bicycle shock absorbing device.

As shown in FIGS. 5 and 5A, when the tube 11 is located at the position as shown, and the adjusting lever 33 is rotated counter clockwise to push the rod 16 toward the cover member 12. The tapered tip 161 is securely engaged with the tapered hole 121. At this position, the shock absorbing device is stiffer and performs as "rebound" status. The hydraulic liquid retained in the chamber 50 can only enter into the space between the cover member 12 and the bowl member 15 by a large pressure via the through holes 122. It is to be noted that when the tube 11 is moved in the cylinder 21, the hydraulic liquid in a chamber 60 in the cylinder 21 enters in a space 31 in the end member 30.

While we have shown and described various embodiments in accordance with the present invention, it should be clear to those skilled in the art that further embodiments may be made without departing from the scope and spirit of the present invention.

What is claimed is:

1. A shock absorbing adjusting structure comprising:

a cylinder having a tube movably inserted into a first end of said cylinder, an end member connected to a second end of said cylinder, a passage defined radially in said end member and a central hole defined in a first side of said end member, said passage communicating with said central hole, an actuating bar rotatably inserted in said passage and a cam means located on a first end of said actuating bar, a first end of said tube adapted to be connected to a part of a bicycle frame and a second end of said tube sealed by a ring assembly which is movably engaged with an inside of said cylinder, a second side of said end member adapted to be connected to another part of the bicycle frame;

a sleeve having a first end securely engaged with said central hole and a rod movably received in said sleeve, a second end of said sleeve movably extending through said ring assembly and located in said tube, said rod having a first end engaged with said cam means of said actuating bar and a second end of said rod being a tapered tip, and a piston assembly connected to a second end of said sleeve, a tapered hole defined centrally through said piston assembly and a plurality of through holes defined through said piston assembly, a pusher movably received in said piston assembly and a seal member located between said pusher and an inside of said piston assembly, a spring biased between said seal member and said pusher so as to urge said seal member to seal said through holes, said second end of said rod extending through said pusher and urging said pusher towards said tapered hole, said tapered tip of said rod movably engaged with said tapered hole.

2. The adjusting structure as claimed in claim 1 further comprising an adjusting lever connected to a second end of said actuating bar.

3. The adjusting structure as claimed in claim 1, wherein said cam means is an stud extending eccentrically and longitudinally from said first end of said actuating bar.

4. The adjusting structure as claimed in claim 1 further comprising a groove defined radially in said actuating bar and said end member having an aperture defined through said first side of said end member, a ball and a spring respectively received in said aperture, said ball biased by said spring and engaged with said groove.

5. The adjusting structure as claimed in claim 1, wherein said piston assembly includes a bowl member threadedly engaged with said second end of said sleeve and a cover member which is threadedly mounted to said bowl member, said tapered hole and said through holes defined through said cover member.

6. The adjusting structure as claimed in claim 5 further comprising a recess defined in a center of said bowl member and said pusher having a guide tube extending from one end thereof, said guide tube movably received in said recess of said bowl member.

* * * * *